United States Patent [19]
Okuyama et al.

[11] Patent Number: 5,689,736
[45] Date of Patent: Nov. 18, 1997

[54] IMAGE OBSERVATION APPARATUS

[75] Inventors: Atsushi Okuyama, Tokorozawa; Shoichi Yamazaki, Yokohama, both of Japan

[73] Assignee: Canon Kabushiki Kaisha, Tokyo, Japan

[21] Appl. No.: 606,851

[22] Filed: Feb. 26, 1996

[30] Foreign Application Priority Data

Feb. 28, 1995 [JP] Japan .................... 7-066992

[51] Int. Cl.⁶ .................... G03B 13/02; A61B 31/14
[52] U.S. Cl. .................... 396/51; 351/210; 250/221
[58] Field of Search .................... 354/410, 62, 219, 354/225, 476, 478; 348/333, 78; 351/210; 250/221; 396/51

[56] References Cited

U.S. PATENT DOCUMENTS

| | | | |
|---|---|---|---|
| 5,093,567 | 3/1992 | Staveley | 250/221 |
| 5,327,191 | 7/1994 | Shindo et al. | 354/410 X |

FOREIGN PATENT DOCUMENTS

| | | |
|---|---|---|
| 3101709 | 4/1991 | Japan . |
| 3109029 | 5/1991 | Japan . |

*Primary Examiner*—W. B. Perkey
*Attorney, Agent, or Firm*—Fitzpatrick, Cella, Harper & Scinto

[57] ABSTRACT

The present invention relates to an image observation apparatus which comprises an optical system having a plurality of reflecting surfaces and a positive refracting power to guide light from an image to an observer and a visual axis detection system including a light source for illuminating an anterior ocular segment of the observer to detect a visual axis of the observer, a light-receiving device for receiving an image of the anterior ocular segment which is formed by light reflected by the anterior ocular segment and having passed through a portion of the optical system, and a device for correcting an aberration of the image of the anterior ocular segment which occurs when the image passes through at least a portion of the optical system.

18 Claims, 8 Drawing Sheets

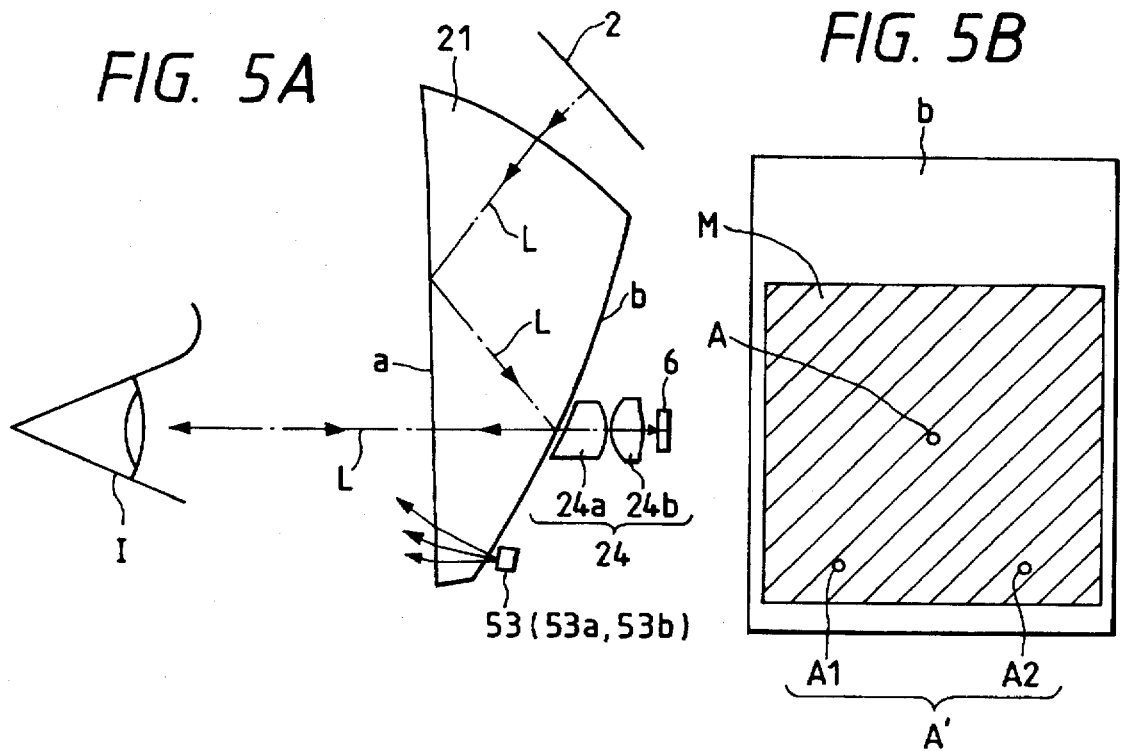
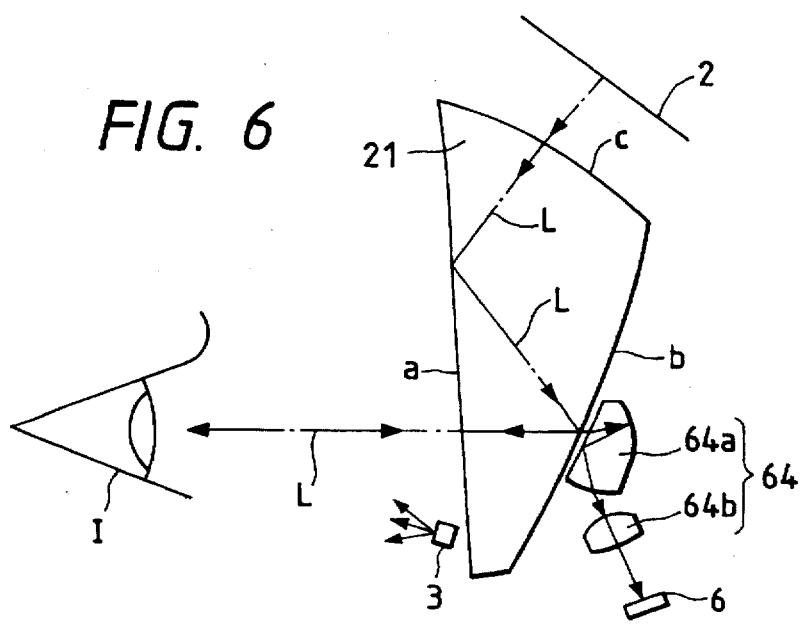

IMAGE OBSERVATION APPARATUS

BACKGROUND OF THE INVENTION

1. Field of the Invention

The present invention relates to an image observation apparatus and, more particularly, to an image observation apparatus which is used to detect the visual axis of an observer who observes a virtual image of an image displayed on a display means and adjusts the observation state of the image by using the visual axis information. The apparatus is suitable for, e.g., the finder of a video camera having a visual axis input function or a head-mounted display having a visual axis input function which is designed to be mounted on the head portion of the observer to observe an image.

2. Related Background Art

Various conventional image observation apparatuses, designed to guide image information displayed on a display means thereby an eye of an observer to allowing him/her to observe the information, are known. A similar image observation apparatus is also known. This apparatus has an optical system (visual axis detection system) for detecting the gazing direction, i.e., the visual axis, of an observer by analyzing an image of an eyeball of the observer. The apparatus controls image information displayed on a display means by using visual axis information obtained by the visual axis detection system.

FIGS. 10 and 11 show such an image observation apparatus disclosed in Japanese Laid-Open Patent Application No. 3-101709 (U.S. Pat. No. 5,093,567). FIG. 10 shows optical paths in the image observation system of this conventional image observation apparatus. FIG. 11 shows optical paths in the visual axis detection system of the image observation apparatus. FIGS. 10 and 11 show a screen 207 of a CRT, and a prism block 200 constituted by optical elements 210, 211, 212, and 213. A first concave mirror 201 reflects only infrared rays but transmits the other kinds of light. A second concave mirror 202 reflects visible light in a narrow wavelength range emerging from the screen 207 of the CRT, but transmits light having other wavelengths. A first plane mirror 203 serves as a half mirror with respect to infrared rays, but reflects the other kinds of light. The apparatus also includes a relay lens 204, a second plane mirror 205 which reflects visible light in a narrow wavelength range emerging from the screen 207 of the CRT, but transmits visible light having the other wavelengths and infrared rays, a point-like infrared source 206, and a light-receiving element 208 for receiving infrared rays.

The function of this conventional art will be described. The function of the image observation system will be described first with reference to FIG. 10. A light beam from an image formed on the screen 207 of the CRT is reflected by the second plane mirror 205, passes through the relay lens 204, and is reflected by the first plane mirror 203, thereby forming an intermediate image P1 on the focal position (focusing point) of the second concave mirror 202. A light beam from the intermediate image P1 is incident on a surface 218 of the prism block 200 and totally reflected by a surface 216. The beam is then reflected by the second concave mirror 202 to propagate toward an eye I of an observer, and is transmitted through the surface 216 to be incident on a surface 215. The beam emerges from a surface 214 and is incident on the eye I. As a result, an enlarged virtual image is formed in front of the observer. The observer observes this virtual image of the image on the screen 207 of the CRT while the virtual image is superposed on an image of an outdoor scene 219 which is transmitted through a surface 217 of the prism block 200, the first concave mirror 201, the second concave mirror 202, and the surfaces 216, 215, and 214.

The function of the visual axis detection system will be described next with reference to FIG. 11. An infrared beam emitted from the infrared source 206 is transmitted through the second plane mirror 205, passes through the relay lens 204, and is partly reflected by the first plane mirror 203. The beam is then incident on the surface 218 of the prism block 200 and totally reflected by the surface 216. Thereafter, the beam is transmitted through the second concave mirror 202 to reach the first concave mirror 201. The beam is reflected by the first concave mirror 201 to propagate toward the eye I of the observer. The beam is then transmitted through the second concave mirror 202 and the surface 216 to be incident on the surface 215, and emerges from the surface 214 to reach the eye I of the observer, thereby illuminating the eye I of the observer. An image of the eye I irradiated with the infrared beam is incident on the prism block 200 again, reversely propagates along the optical path for irradiation, and emerges from the prism block 200. Thereafter, the beam is partly transmitted through the first plane mirror 203 and is incident on the light-receiving element 208. The visual axis of the observer is detected by analyzing the image of the eye which is formed on the light-receiving element 208.

In the conventional art, however, since the distance between the first concave mirror 201 for forming an image and the light-receiving element 208 is large, the focusing magnification of an image of an eye is large. For this reason, the light-receiving element 208 becomes large in size, and so does the apparatus.

SUMMARY OF THE INVENTION

It is an object of the present invention to properly arrange an image observation system used to enlarge/observe image information displayed on a display means, and a visual axis detection system for detecting the visual axis of an observer in, for example, the finder of a video camera or an image observation apparatus, a so-called head-mounted display, which is mounted on the head portion of the observer to allow him/her to observe image information displayed on a display means, thereby reducing the overall size of the apparatus.

According to the present invention, there is provided an image observation apparatus comprising:

an optical system having a plurality of reflecting surfaces and a positive refracting power to guide light from an image to an observer; and a visual axis detection system including a light source for illuminating an anterior ocular segment of the observer to detect a visual axis of the observer, light-receiving means for receiving an image of the anterior ocular segment which is formed by light reflected by the anterior ocular segment and having passed through a portion of the optical system, and means for correcting an aberration of the image of the anterior ocular segment which occurs when the image passes through at least a portion of the optical system.

According to an aspect of the image observation apparatus of the present invention, the optical system is a prism member having a first surface opposing the observer, a second surface constituted by a reflecting concave surface, and a third surface on which the light from the image is incident, the light from the image which is incident on the third surface is totally reflected by the first surface, focused/ reflected by the first surface toward the second surface, and emerges from the first surface, an area which transmits the light reflected by the anterior ocular segment is formed on a portion of the second surface, and a stop of the visual axis detection system is disposed near the area which transmits the light reflected by the anterior ocular segment or, more preferably, is disposed at the same position as the area which transmits the light reflected by the anterior ocular segment.

In addition, the area which transmits the light reflected by the anterior ocular segment preferably has a diameter of not more than 2 mm.

Furthermore, preferably, the light source is an infrared source, and a dichroic film for reflecting visible light and transmits infrared light is formed on the area which is formed on a portion of the second surface and transmits the light reflected by the anterior ocular segment.

The image observation apparatus of the present invention takes the following forms:

directly illuminating the anterior ocular segment of the observer with illumination light from the light source; and forming an area which transmits illumination light from the light source on the second surface, and illuminating the anterior ocular segment of the observer with illumination light from the light source via the first and second surfaces.

According to another aspect of the image observation apparatus of the present invention, a plurality of areas which transmit the light reflected by the anterior ocular segment are formed on portions of the second surface.

According to still another aspect of the image observation apparatus of the present invention, the apparatus includes display means for forming the image.

According to still another aspect of the image observation apparatus of the present invention, at least one of surfaces constituting the optical system is a curved surface having only one symmetrical surface.

According to still another aspect of the image observation apparatus of the present invention, the means for correcting the aberration of the image of the anterior ocular segment is a wedge-shaped optical member, and more preferably, the optical member has a refracting power.

The image observation apparatus of the present invention can be suitably used for a photographing apparatus such as a video camera, a head-mounted display, or the like, and can perform various control operations on the basis of detected visual axis information.

The above and other objects, and advantages of the present invention will be apparent from the following detailed description in conjunction with the accompanying drawings.

BRIEF DESCRIPTION OF THE DRAWINGS

FIGS. 5A and 5B are schematic views showing the main part of the fifth embodiment of the present invention;

FIG. 6 is a schematic view showing the main part of the sixth embodiment of the present invention;

DETAILED DESCRIPTION OF THE PREFERRED EMBODIMENTS

Figure 1A:
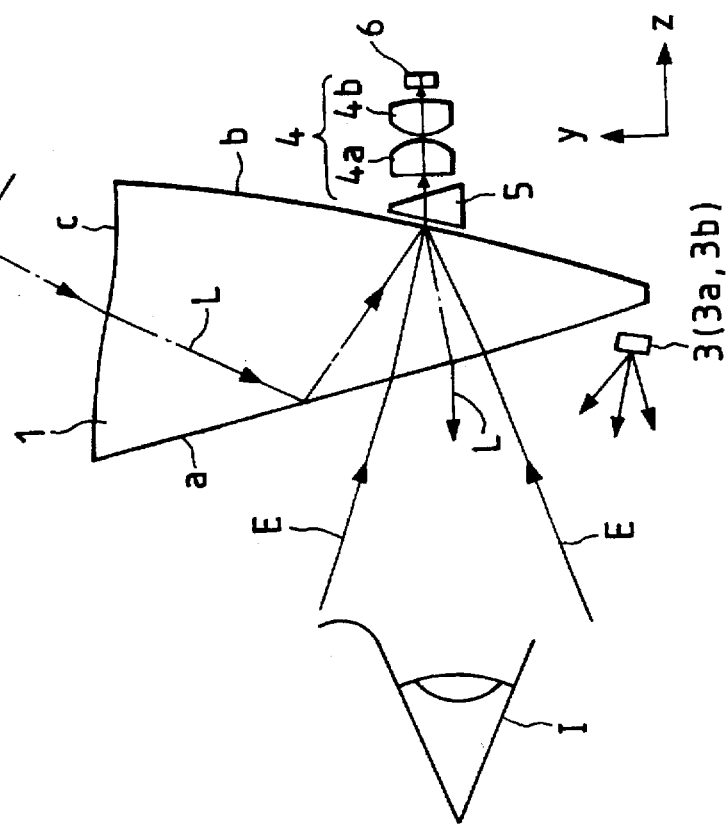
FIGS. 1A and 1B are schematic views showing the main part of the first embodiment of the present invention.
Figure 1B:
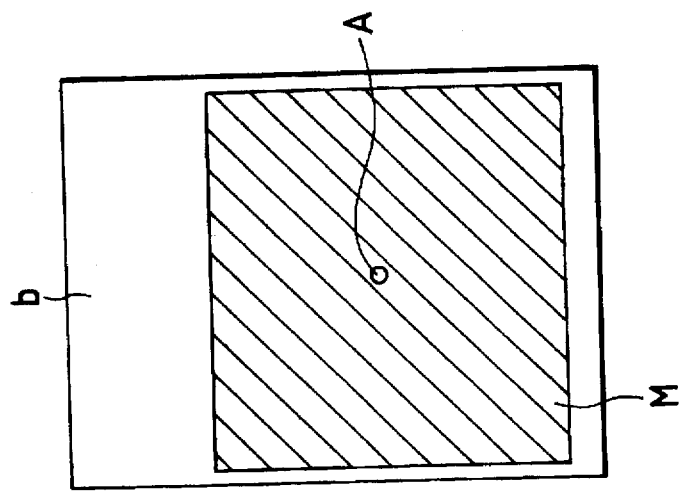

FIG. 1A is a schematic view showing the main part of the first embodiment of the present invention. FIG. 1B is a view for explaining the second action surface of an optical element in FIG. 1A.

Referring to FIGS. 1A and 1B, an optical member (observation optical element) 1 has a first action surface a serving as both a total reflection surface and an exit surface, a second action surface b having a reflecting surface and a partly opening portion (light-transmitting portion), and a third action surface c as an incident surface. The optical member 1 is a wedge-shaped optical block having a positive refracting power as a whole. The second action surface b of the optical member 1 is inclined with respect to the vertical direction of an eye I of an observer. A reflecting film M for reflecting a light beam from an image displayed on a display means 2 (to be described later) is formed on a portion of the second action surface b. An opening portion A having a predetermined shape is formed in the central portion of the reflecting film M to allow a light beam reflected by an eyeball of the observer to pass.

In order to make the optical member 1 in this embodiment serve as a telecentric system, and correcting the imaging characteristics and distortion, the three action surfaces a, b, and c are constituted by three-dimensional curved surfaces having no symmetrical rotation axis (free form surface). The three action surfaces a, b, and c in this embodiment each have a curved surface symmetrical about only a plane parallel to a drawing surface and including a fundamental optical axis L.

The display means 2 is constituted by, e.g., a liquid crystal image display element and the like and used to display an image (picture). The display means 2 is disposed above the observer (below the observer if the first action surface a is inclined in the opposite direction to that in FIG. 1A).

An infrared source 3 (3a, 3b) illuminates the anterior ocular segment of the eyeball (eye) I of the observer with infrared rays. At least two infrared sources 3 are arranged to be symmetrical about a plane parallel to the drawing surface and including the fundamental optical axis (central axis) to illuminate the eye I of the observer obliquely from below.

An imaging lens 4 has two positive lenses 4a and 4b and serves to reduce/form an image of an eye of the observer and a reflected cornea image. The two lens surfaces of the positive lens 4a are formed into rotation-symmetrical aspherical surfaces.

The prism surface (light-transmitting surface), of a wedge-shaped prism 5, which is located on the optical element 1 side has a curvature. In this embodiment, as will be described later, the wedge-shaped prism 5 properly corrects the astigmatism of an image of an eye of the observer and a reflected cornea image formed by the above imaging lens 4 and is caused when the images pass through the first and second action surfaces a and b, thereby allowing high-precision visual axis detection.

A light-receiving element 6 is constituted by, e.g., a photoelectric conversion element and designed to detect an image formed by the imaging lens 4. Referring to FIG. 1A, an optical path E extends from the eye I of the observer to a stop in the visual axis detection system, and the fundamental optical axis L is a line connecting the eye I of the observer and the center of the display means 2.

Of the above parts, the optical element 1, the display means 2, and the like constitute a part of the image observation system, and the infrared source 3, the imaging lens 4, the wedge-shaped prism 5, the light-receiving element 6, and the like constitute a part of the visual axis detection system.

The optical function of the image observation system will be described next. A light beam from an image displayed on the display means 2 is incident on the third action surface c (incident surface) and totally reflected by the first action surface a. The light beam is then reflected by the reflecting film M formed on the second action surface b to propagate toward the first action surface a again, and is refracted when it is transmitted through the first action surface a. The light beam emerging from the optical element 1 becomes a light beam having a divergent angle (convergent angle) or a parallel light beam corresponding to the diopter of the observer, and is incident on the eye I of the observer. With this operation, a virtual image is formed in front of the observer.

Adjustment for the diopter of the observer is performed by parallely moving the display means 2 along the fundamental optical axis L of the display means 2.

The optical function of the visual axis detection system will be described next. As shown in FIGS. 1A and 1B, infrared rays emitted from the two infrared sources 3a and 3b illuminate the anterior ocular segment of the eyeball of the observer from a direction different from the fundamental optical axis L. The illumination light is reflected/scattered by the cornea and pupil of the observer. These reflected light beams are incident on the first action surface a of the optical element 1, and pass through the opening portion A formed in the central portion of the reflecting film M formed on the second action surface b. The light beams are then formed into images on the light-receiving element 6 by the imaging lens 4 via the wedge-shaped prism 5.

The light reflected by the cornea forms a Purkinje image on the light-receiving element 6. The light scattered/reflected by the pupil forms a pupil image. The visual axis of the observer is detected by a visual axis detection circuit (not shown) on the basis of the Purkinje image and the pupil image obtained from the light-receiving element 6. A detection method used in this case is, for example, the method disclosed in Japanese Laid-Open Patent Application No. 3-109029.

According to this prior art, two predetermined photoelectric element arrays are properly selected from a plurality of photoelectric element arrays constituting a light-receiving means, and information based on a reflected cornea image and a reflected iris image is obtained by the two selected photoelectric element arrays, thereby calculating the visual axis of the observer with a high precision.

In this embodiment, as described above, at least one of the lenses constituting the imaging lens 4 has an aspherical lens surface. With this arrangement, the off-axis imaging performance can be improved.

As described above, the optical element 1 of this embodiment has a wedge-like shape. In the visual axis detection system, an astigmatism caused in the optical element 1 is effectively corrected by placing the wedge-shaped prism 5 (an optical member for correcting astigmatism) in the optical path of the visual axis detection system. In addition, since at least one surface (the light-transmitting surface on the optical element 1 side) of the wedge-shaped prism 5 has a curvature, an astigmatism can be properly corrected.

In this embodiment, when one opening portion is to be formed in the reflecting film M, it suffices to place the stop of the imaging lens 4 near the opening portion A. With this arrangement, the size of the opening portion A can be reduced to prevent an omission error of a light beam from the display means 2. The opening portion A preferably coincides with the stop. By setting the size of the opening portion A to be less than 2 mm, its size becomes smaller than the diameter of the pupil of the eye. As a result, an omission error of a light beam from the display means 2 can be prevented more effectively.

In this embodiment, as described above, as a light beam illuminating the eye I of the observer, an infrared beam having a low visual sensitivity is used. In the embodiment, therefore, by using a member (lens) for cutting visible light as at least one of the optical systems constituting the visual axis detection system, the detection precision for a visual axis is improved.

Figure 2:
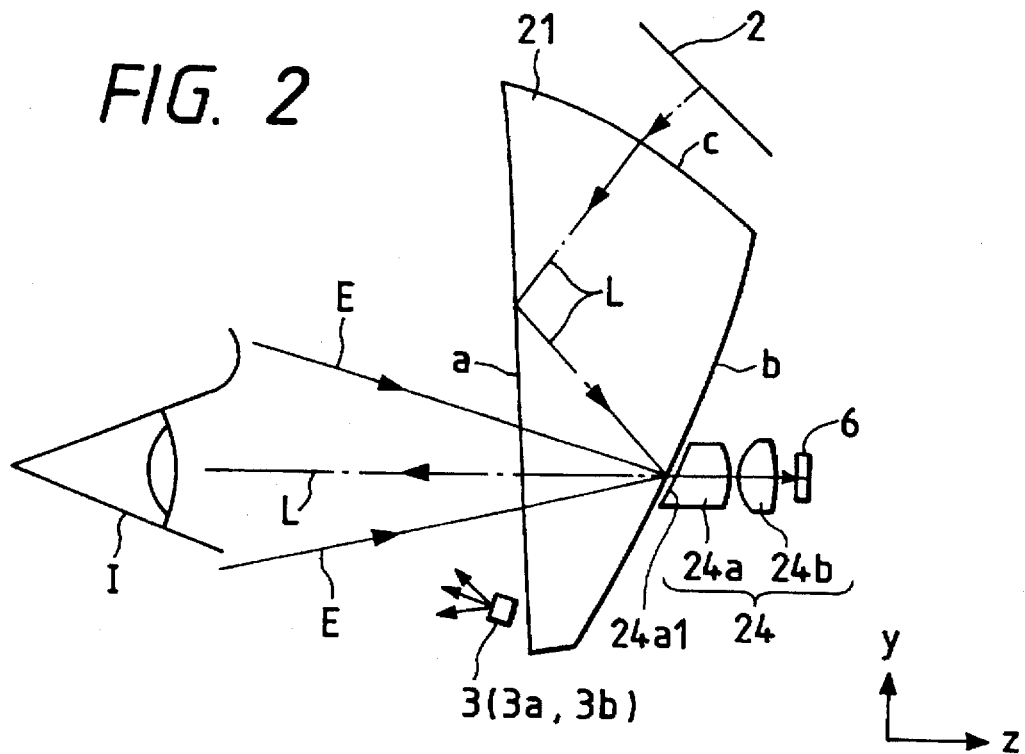
FIG. 2 is a schematic view showing the main part of the second embodiment of the present invention.

FIG. 2 is a schematic view showing the main part of the second embodiment of the present invention. The same reference numerals in FIGS. 1A and 1B denote the same parts as in FIG. 2.

This embodiment is different from the first embodiment in the shape of an optical element 21 and the arrangement of part of the visual axis detection system. However, these embodiments have almost the same arrangement and optical function. That is, the same effects as those of the first embodiment can be obtained in the second embodiment.

An imaging lens system 24 includes a wedge-shaped lens 24a for correcting the astigmatism of an image of an eye of an observer and a reflected cornea image which is caused when the images pass through first and second action surfaces a and b of the optical element 21, and a positive lens (imaging lens) 24b obtained by forming a rotation-symmetrical aspherical surface on the lens surface on the optical element 21 side. The wedge-shaped lens 24a is spaced apart from the second action surface b of the optical element 21 through a slight air gap. With such an arrangement, the number of lenses of the imaging lens system 24 can be reduced, and the overall size of the apparatus can be reduced. If the surface (inclined surface) of this wedge-shaped lens 24a1 on the optical element 21 side has a curvature, a decentering aberration caused in the second action surface b can be corrected more properly. In addition, the inclined surface 24a1 is made to have the same or almost the same shape as that of the second action surface b, and is joined thereto so as to eliminate refraction on this inclined surface. With this arrangement, the optical performance can be further improved.

Figure 3:
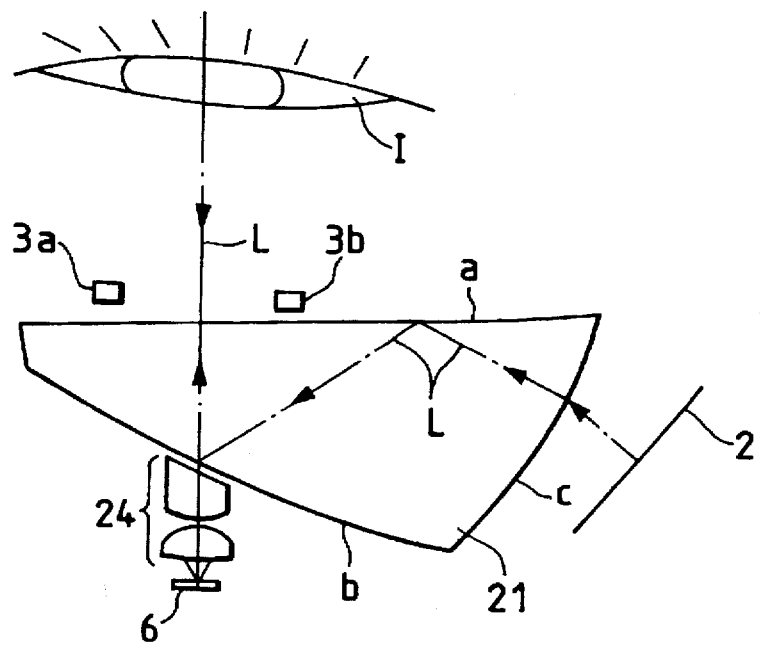
FIG. 3 is a schematic view showing the main part of the third embodiment of the present invention.

FIG. 3 is a schematic view showing the main part of the third embodiment of the present invention. The same reference numerals in FIG. 3 denote the same parts as in FIG. 2.

In this embodiment, an image observation system is developed in the lateral direction with respect to an observer. The third embodiment is different from the second embodiment in that a second action surface b of an optical element 21 is inclined with respect to the lateral direction of an eye of the observer, and a display means 2 is placed on the left (or right) side of the observer. However, other arrangements and optical effects of the third embodiment are almost the same as those of the second embodiment. The same effects as those of the second embodiment are therefore obtained.

Figure 4A:
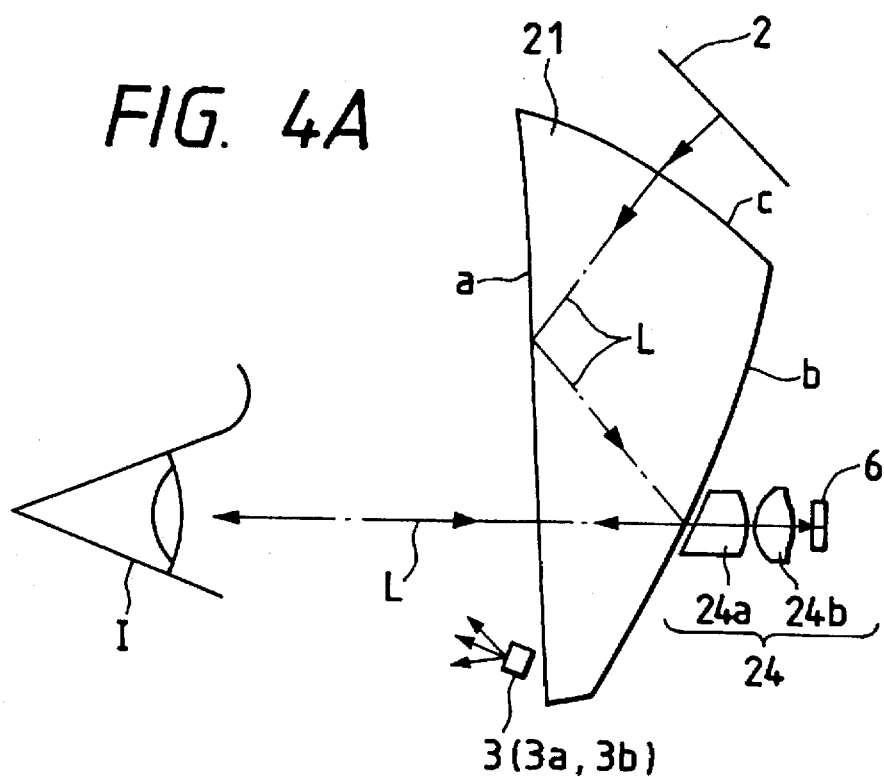
FIGS. 4A and 4B are schematic views showing the main part of the fourth embodiment of the present invention.
Figure 4B:
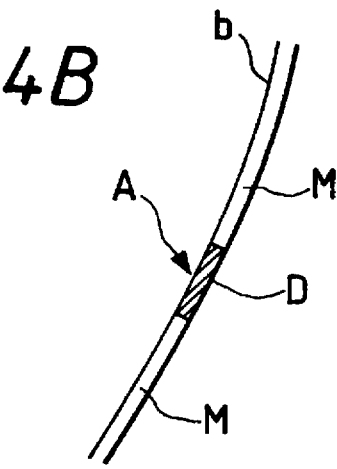

FIG. 4A is a schematic view showing the main part of the fourth embodiment of the present invention. FIG. 4B is an enlarged view of a portion of a second action surface b of an optical element in FIG. 4A. The same reference numerals in FIGS. 4A and 4B denote the same parts as in FIG. 2.

This embodiment is different from the second embodiment in that a dichroic film D which transmits infrared light and reflects visible light is formed on an opening portion A formed in a second action surface b to prevent an omission error of a light beam from a display means 2 more effectively. Other arrangements and optical effects of the fourth embodiment are the same as those of the second embodiment. The same effects as those of the second embodiment are therefore obtained.

FIG. 4B shows the opening portion A formed in a portion of the second action surface b. The dichroic film D which transmits infrared light and reflects visible light is formed on the opening portion A. With this arrangement, in this embodiment, infrared light for detection of a visual axis and visible light for observation of an observation image is reflected to prevent an omission error of a light beam from a display means 2, thereby allowing observation of a high-quality image.

In this embodiment, a reflecting film (dichroic film) which reflects a light beam (visible light) from an image displayed on the display means 2 and transmits a light beam (infrared light) from an infrared source 3 may be formed on an entire area M of the second action surface b.

FIG. 5A is a schematic view showing the main part of the fifth embodiment of the present invention. FIG. 5B is a view for explaining the second action surface of an optical element in FIG. 5A. The same reference numerals in FIGS. 5A and 5B denote the same parts as in FIG. 2.

This embodiment is different from the second embodiment in that an infrared source 53 is disposed outside a second action surface b (the opposite side to an eye I of an observer with respect to the optical element 21), and two opening portions A1 and A2 through which infrared light emitted from the infrared source 53 passes are formed in portions of a reflecting film M formed on the second action surface b. Other arrangements and optical effects of the fifth embodiment are almost the same as those of the second embodiment. The same effects as those of the second embodiment are therefore obtained.

FIG. 5B shows the opening portions A1 and A2 each having a predetermined shape and formed in the reflecting film M. Infrared light emitted from the infrared source 53 (53a, 53b) passes through the two Opening portions A1 and A2 to illuminate the anterior ocular segment of an eyeball of the observer.

The optical function of an image observation system in this embodiment is the same as that of the above embodiments. The optical function of a visual axis detection system will be described below.

Infrared light emitted from the infrared source 53 (53a, 53b) disposed outside the second action surface b passes through the an opening portion A (the two opening portions A1 and A2 in this embodiment) formed in the reflecting film M formed on the second action surface b, and is transmitted/refracted through a first action surface a. As a result, the light illuminates the anterior ocular segment of an eyeball of the observer from a direction different from a fundamental optical axis L. The illumination light is reflected/scattered by a cornea and pupil of the observer in the same manner as in the above embodiments. These reflected light beams are incident from the first action surface a of the optical element 21, pass through the opening portion A formed in the central portion of the reflecting film M on the second action surface b, and are formed into images on a light-receiving element 6 by an imaging lens 24b via a wedge-shaped lens 24a.

The light reflected by the cornea forms a Purkinje image on the light-receiving element 6, and the light scattered/reflected by the pupil forms a pupil image. The visual axis direction of the observer is detected by a visual axis detection circuit (not shown) on the basis of the Purkinje image and the cornea image obtained from the light-receiving element 6.

FIG. 6 is a schematic view showing the main part of the sixth embodiment of the present invention. The same reference numerals in FIG. 6 denote the same parts as in FIG. 2.

This embodiment is different from the second embodiment in the arrangement of part of a visual axis detection system. Other arrangements and optical functions of the second embodiment are almost the same as those of the second embodiment. The same effects as those of the second embodiment are therefore obtained.

An imaging lens 64 includes a wedge-shaped lens 64a (an optical member for correcting an astigmatism) having an inner reflecting surface, and a positive lens 64b (an imaging lens). The optical axis of an image lens system is bent by using the inner reflecting surface of the wedge-shaped lens 64a.

The wedge-shaped lens 64a in this embodiment forms a primary image near the exit surface. This primary image is formed on a surface of a light-receiving element 6 again by the positive lens 64b. With this arrangement, in this embodiment, an imaging lens system can be developed upward or downward with respect to the drawing surface, thereby attaining a reduction in the overall size of the apparatus.

Figure 7A:
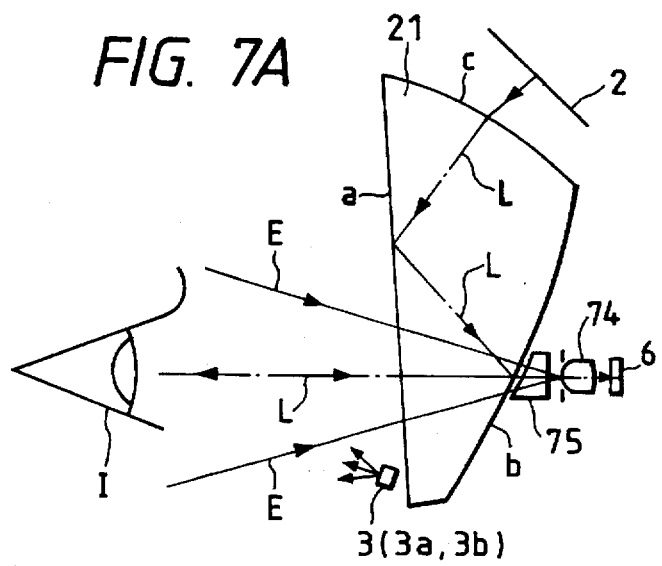
FIGS. 7A, 7B, and 7C are schematic views showing the main part of the seventh embodiment of the present invention.
Figure 7B:
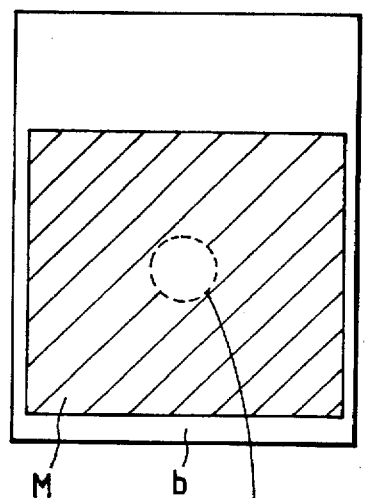
Figure 7C:
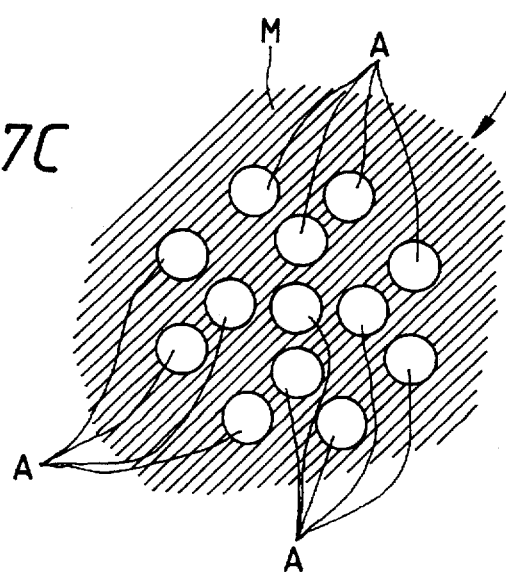

FIG. 7A is a schematic view showing the main part of the seventh embodiment of the present invention. FIG. 7B is a view for explaining the second action surface in FIG. 7A. FIG. 7C is an enlarged view of a portion in FIG. 7B. The same reference numerals in FIGS. 7A to 7C denote the same parts as in FIG. 2.

This embodiment is different from the second embodiment in that many small opening portions A each having a predetermined shape are formed near the center of a reflecting film M formed on the second action surface b. In addition, the arrangement of part of a visual axis detection system in the seventh embodiment is different from that in the second embodiment. Other arrangements and optical functions of the seventh embodiment are almost the same as those of the second embodiment. The same effects as those of the second embodiment are therefore obtained.

A prism surface (the light-transmitting surface on the optical element 21 side) of a prism 75 for correcting an astigmatism has a curvature. At least one of lenses constituting an imaging lens system 74 has a rotation-symmetrical aspherical lens surface. This system reduces/forms an image of an eye of an observer and a reflected cornea image.

As shown in FIGS. 7B and 7C, a reflecting film M for reflecting a light beam from a display means 2 is formed on a portion of a second action surface b of an optical element 21. In addition, the many small opening portions A each having a predetermined shape and allowing light reflected by an eyeball of an observer to pass are formed in the central portion of the reflecting film M.

In this embodiment, even if the light beam effect portion of the imaging lens system 74 on the second action surface b is set to be large, since an omission error of a light beam from the display means 2 due to the opening portions A does not easily occur, the stop of the imaging lens system 74 need not be disposed near the opening portions A. With this arrangement, the imaging lens system can be simplified to attain a further reduction in size.

Figure 8:
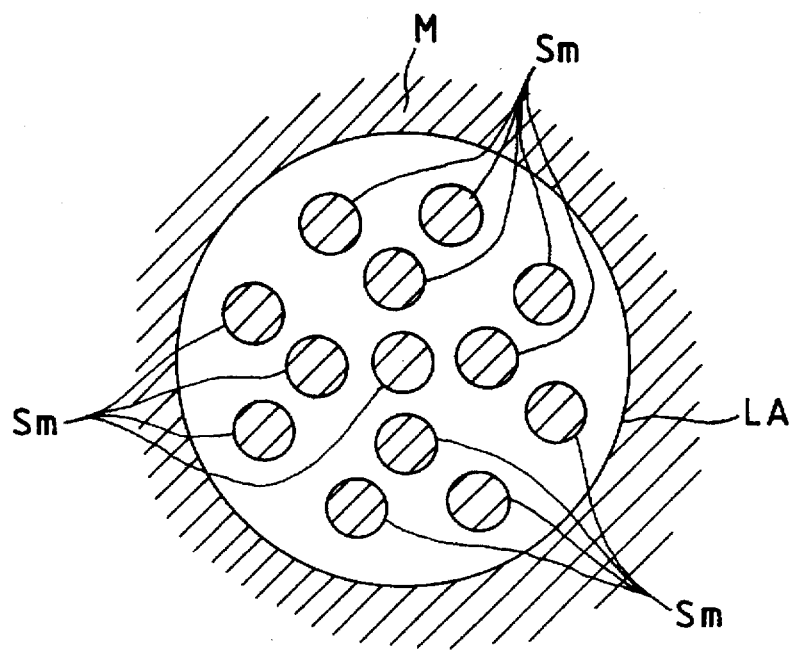
FIG. 8 is a view showing a modification of the seventh embodiment of the present invention.

In this embodiment, as shown in FIGS. 7B and 7C, the many small opening portions A are formed in the central portion of the reflecting film M. However, the present invention is not limited to this form. For example, as shown in FIG. 8, many reflecting portions $S_m$ may be formed in a large opening portion LA. In this form, the same effects as in the form shown in FIGS. 7B and 7C can be obtained.

The following are the first and second numerical embodiments of the optical systems in which light reflected by the anterior ocular segment illuminated by the infrared source reaches the light-receiving element. The first and second numerical embodiments are respectively based on the first and second embodiments described above.

First Numerical Embodiment

| Surface | R(mm) | d(mm) | n | shift(mm) | tilt(deg) |
|---|---|---|---|---|---|
| 1 | free form surface | 10.35 | 1.49 | 1.73 | 16.00 |
| 2 | free form surface | 0.70 | | 3.28 | −13.80 |
| 3 | ∞ | 3.00 | 1.49 | 0.00 | −15.00 |
| 4 | ∞ | 2.00 | | 0.00 | 16.00 |
| 5 | −27.083 | 2.40 | 1.49 | 1.45 | 0.00 |
| 6 | rotational aspherical surface | 0.30 | | 1.45 | 0.00 |
| 7 | rotational aspherical surface | 2.21 | 1.49 | 1.45 | 0.00 |
| 8 | −8.38 | 0.50 | | 1.45 | 0.00 |
| 9 | ∞ | 0.87 | 1.49 | 1.45 | 0.00 |
| 10 | ∞ | | | 1.45 | 0.00 |

Figure 9:
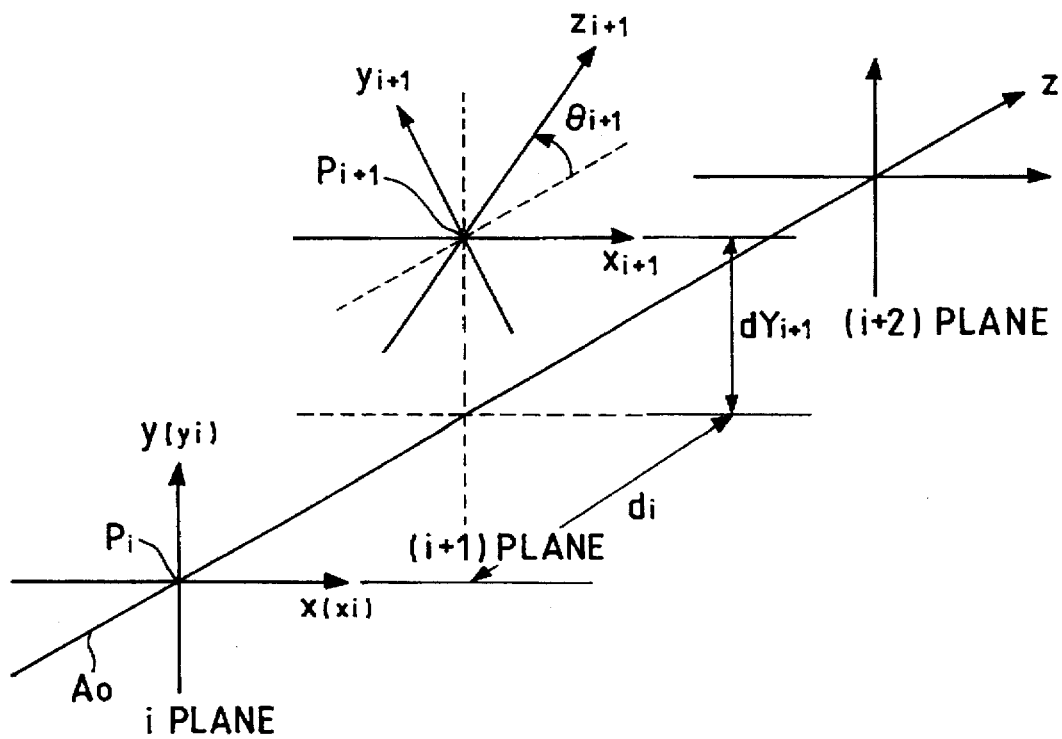
FIG. 9 is a graph for explaining a coordinate system in numerical embodiments of the present invention.
Figure 10:
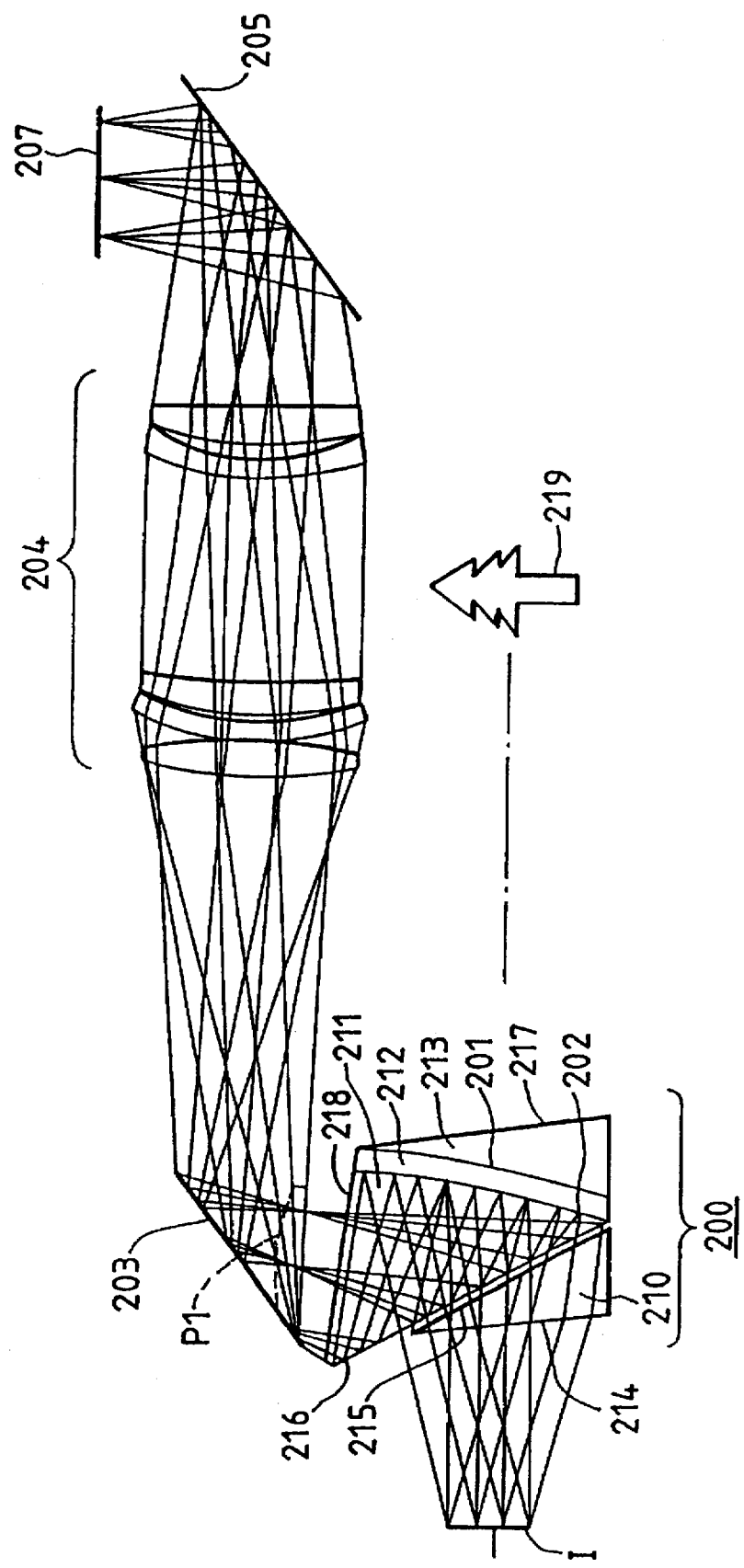
FIG. 10 is a schematic view showing the main part of a conventional image observation apparatus.
Figure 11:
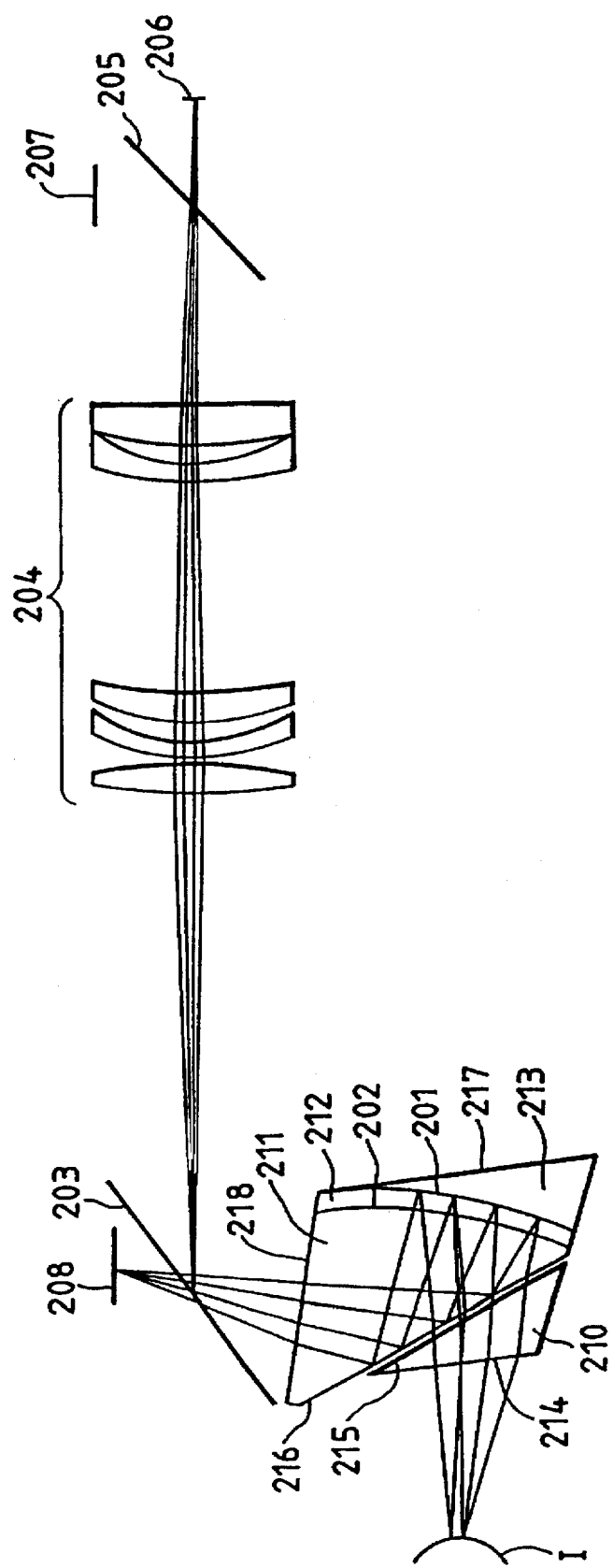
FIG. 11 is a schematic view showing the main part of the conventional image observation apparatus.

FIG. 9 is a graph for explaining coordinate systems in the numerical embodiments of the present invention. Referring to FIG. 9, "d" represents the distance between the respective surfaces on the fundamental optical axis, and each shift and each tilt represent the moving amount (dY) and a gradient (θ) of an actual surface vertex with respect to the fundamental optical axis ($A_0$). Each surface is defined by a local coordinate system which is converted with a shift and a tilt. The first and second surfaces (the action surfaces a and b) are free form surfaces. Each quadratic surface has an aspherical surface term represented by the following polynomial. Each free form surface is represented by:

$$z = \frac{c(x^2 + y^2)}{1 + \sqrt{1-(1+k)c^2(x^2+y^2)}} +$$

$$c_2 + c_4 y + c_5(x^2 - y^2) + c_6(-1 + 2x^2 + 2y^2) + c_{10}(-2y + 3x^2 y + 3y^3) +$$

$$c_{11}(3x^2 y - y^3) + c_{12}(x^4 - 6x^2 y^2 + y^4) + c_{13}(-3x^2 + 4x^4 + 3y^2 - 4y^4) +$$

$$c_{14}(1 - 6x^2 + 6x^4 - 6y^2 + 12x^2 y^2 + 6y^4)$$

The sixth and seventh surfaces are rotation-symmetrical aspherical surfaces, which are given by:

$$Z = \frac{cY^2}{1 + \sqrt{1-(1+k)(cY)^2}} + AY^4 + BY^6 + CY^8 + DY^{10} + EY^{12}$$

The following table shows each aspherical surface coefficient.

| R1 | |
|---|---|
| α | −5.017$_{e-4}$ |
| k | −6.662$_{e+3}$ |
| c2 | 0.000$_{e+0}$ |
| c4 | 0.000$_{e+0}$ |
| c5 | −1.104$_{e-5}$ |
| c6 | −5.061$_{e-5}$ |
| c10 | −1.104$_{e-5}$ |
| c11 | 8.647$_{e-6}$ |
| c12 | 1.883$_{e-7}$ |
| c13 | 1.802$_{e-7}$ |
| c14 | 4.616$_{e-8}$ |
| R2 | |
| c | −1.127$_{e-2}$ |
| k | 4.620$_{e+0}$ |
| c2 | 0.000$_{e+0}$ |
| c4 | 0.000$_{e+0}$ |
| c5 | −1.087$_{e-3}$ |
| c6 | −2.514$_{e-6}$ |
| c10 | −7.495$_{e-6}$ |
| c11 | 8.647$_{e-6}$ |
| c12 | 1.883$_{e-7}$ |
| c13 | −2.302$_{e-7}$ |
| c14 | 3.059$_{e-7}$ |
| R6 | |
| c | −4.382$_{e-1}$ |
| k | −8.813$_{e-1}$ |
| A | 3.699$_{e-3}$ |
| B | 1.198$_{e-3}$ |
| C | −1.493$_{e-4}$ |
| D | 4.780$_{e-6}$ |
| E | 0.000$_{e+0}$ |
| R7 | |
| c | 3.404$_{e-1}$ |
| k | −1.442$_{e-1}$ |
| A | 5.579$_{e-3}$ |
| B | 6.032$_{e-4}$ |
| C | −6.459$_{e-4}$ |
| D | −1.015$_{e-5}$ |
| E | 0.000$_{e+0}$ |

Note that the ninth and tenth surfaces are the surfaces of a cover glass on the light-receiving element.

Second Numerical Embodiment

| Surface | R(mm) | d(mm) | n | shift(mm) | tilt(deg) |
|---|---|---|---|---|---|
| 1 | free form surface | 7.77 | 1.49 | −13.66 | 8.17 |
| 2 | free form surface | 1.50 | | 1.18 | −23.57 |
| 3 | −38.764 | 2.39 | 1.49 | 1.18 | −23.57 |
| 4 | −3.719 | 0.40 | | 0.15 | 0.00 |
| 5 | 2.72 | 2.40 | 1.49 | 0.15 | 0.00 |
| 6 | rotational aspherical surface | 0.50 | | 0.15 | 0.00 |
| 7 | ∞ | 0.60 | 1.49 | 0.15 | 0.00 |
| 8 | ∞ | | | 0.15 | 0.00 |

The first and second surfaces are free form surfaces similar to those in the first numerical embodiment. The sixth surface is a rotation-symmetrical aspherical surface.

The following are the aspherical surface coefficients of the respective surfaces.

| R1 | |
|---|---|
| α | $-4.165_{e-3}$ |
| k | $9.462_{e+1}$ |
| c2 | $0.000_{e+0}$ |
| c4 | $0.000_{e+0}$ |
| c5 | $-4.399_{e-3}$ |
| c6 | $-2.966_{e-4}$ |
| c10 | $-1.286_{e-5}$ |
| c11 | $1.699_{e-6}$ |
| c12 | $1.383_{e-7}$ |
| c13 | $9.559_{e-7}$ |
| c14 | $-3.688_{e-8}$ |
| R2 | |
| c | $-1.511_{e-2}$ |
| k | $4.597_{e+1}$ |
| c2 | $0.000_{e+0}$ |
| d4 | $0.000_{e+0}$ |
| c5 | $-1.832_{e-3}$ |
| c6 | $2.762_{e-4}$ |
| c10 | $-2.063_{e-5}$ |
| c11 | $2.010_{e-5}$ |
| c12 | $3.243_{e-7}$ |
| c13 | $-8.128_{e-7}$ |
| c14 | $-3.688_{e-8}$ |
| R6 | |
| c | $-4.129_{e-1}$ |
| k | $-2.218_{e+1}$ |
| A | $-5.919_{e-2}$ |
| B | $4.894_{e-2}$ |
| C | $-1.537_{e-2}$ |
| D | $1.914_{e-3}$ |
| E | $0.000_{e+0}$ |

Note that the seventh and eighth surfaces are the surfaces of the cover glass of the light-receiving element.

What is claimed is:

1. An image observation apparatus comprising:

an optical system having a plurality of reflecting surfaces and a positive refracting power to guide light from an image to an observer; and a visual axis detection system comprising a light source for illuminating an anterior ocular segment of the observer to detect a visual axis of the observer, light-receiving means for receiving an image of the anterior ocular segment which is formed by light reflected by the anterior ocular segment and having passed through a tilted curved surface constituting said optical system, and correcting means for correcting an aberration of the image of the anterior ocular segment which occurs when the image passes through the tilted curved surface constituting said optical system, said correcting means comprising a tilted curved surface.

2. An apparatus according to claim 1, wherein said optical system has a first surface opposing the observer, a second surface constituted by a reflecting concave surface, and a third surface on which the light from the image is incident, and the light from the image which is incident on the third surface is totally reflected by the first surface, focused/reflected by the second surface toward the first surface, and emerges from the first surface.

3. An apparatus according to claim 2, wherein said optical system is a prism member on which the first, second, and third surfaces are formed.

4. An apparatus according to claim 2, wherein an area which transmits the light reflected by the anterior ocular segment is formed on a portion of the second surface.

5. An apparatus according to claim 4, wherein said visual axis detection system has a stop near the area which transmits the light reflected by the anterior ocular segment.

6. An apparatus according to claim 5, wherein said visual axis detection system has a stop at the same position as that of the area which transmits the light reflected by the anterior ocular segment.

7. An apparatus according to claim 4, wherein the area which transmits the light reflected by the anterior ocular segment has a diameter of less than 2 mm.

8. An apparatus according to claim 2, further comprising a plurality of areas which transmit the light reflected by the anterior ocular segment and are formed on portions of the second surface.

9. An apparatus according to claim 4, wherein said light source is an infrared source, and a dichroic film for reflecting visible light and transmitting light is formed on the area which is formed on a portion of the second surface and transmits the light reflected by the anterior ocular segment.

10. An apparatus according to claim 2, wherein illumination light from said light source directly illuminates the anterior ocular segment of the observer.

11. An apparatus according to claim 2, further comprising an area which transmits the illumination light from said light source and is formed on the second surface, and wherein the illumination light from said light source illuminates the anterior ocular segment of the observer via the first and second surfaces.

12. An apparatus according to claim 1, further comprising display means for forming the image.

13. An apparatus according to claim 1, at least one of said plurality of reflecting surfaces being a curved surface only symmetrical with respect to a plane containing a ray emerging from a central portion of the image and passing a central portion of a pupil.

14. An apparatus according to claim 1, wherein the aberration is an astigmatism.

15. An apparatus according to claim 1, wherein said correcting means is a wedge-shaped optical member.

16. An apparatus according to claim 15, wherein said optical member has a refracting power.

17. An apparatus according to claim 1, further comprising a stop for said visual axis detection system, said stop being provided between said optical system and said correcting means.

18. An apparatus according to claim 1, said stop comprising an opening portion formed in said optical system.

* * * * *

UNITED STATES PATENT AND TRADEMARK OFFICE
CERTIFICATE OF CORRECTION

PATENT NO. : 5,689,736
DATED : November 18, 1997
INVENTOR(S) : Okuyama et al.

It is certified that error appears in the above-identified patent and that said Letters Patent is hereby corrected as shown below:

COLUMN 1:

Line 19, "thereby an eye of an observer to" should read --to an eye of an observer thereby--.

COLUMN 3:

Line 18, "transmits" should read --transmitting--.

COLUMN 5:

Line 1, "light-transmitting surface)," should read --light-transmitting surface)--; and Line 7, "and is" should read --that is--.

COLUMN 7:

Line 58, "Opening" should read --opening--.

COLUMN 8:

Line 1, delete "the" (first occurrence); and

Line 64, "one of lenses" should read --one of the lenses--.

UNITED STATES PATENT AND TRADEMARK OFFICE
CERTIFICATE OF CORRECTION

PATENT NO. : 5,689,736
DATED : November 18, 1997
INVENTOR(S) : Okuyama et al.

It is certified that error appears in the above-identified patent and that said Letters Patent is hereby corrected as shown below:

COLUMN 10:

Line 19, "c14  $4.616_{e-8}$" should read --c14  $-4.616_{e-8}$--.

COLUMN 11:

Line 6, "c2  $0.000_{e-0}$" should read --c2  $0.000_{e+0}$--;

Line 15, "k  $4.597_{e+1}$" should read --k  $4.597_{e+0}$--;

Line 17, "d4  $0.000_{e+0}$" should read --c4  $0.000_{e+0}$--; and

Line 19, "c6  $2.762_{e-4}$" should read --c6  $-2.762_{e-4}$--.

COLUMN 12:

Line 26, "light" should read --infrared light--.

Signed and Sealed this

Nineteenth Day of May, 1998

*Attest:*

BRUCE LEHMAN

*Attesting Officer*     *Commissioner of Patents and Trademarks*